May 12, 1942.  W. H. FOSTER  2,282,716
SPRING
Filed April 6, 1940
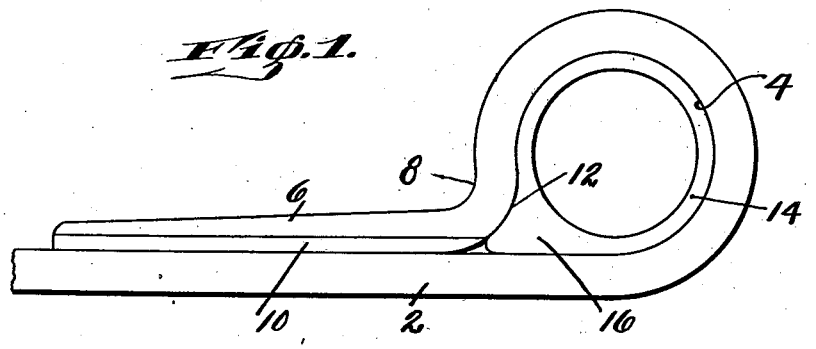
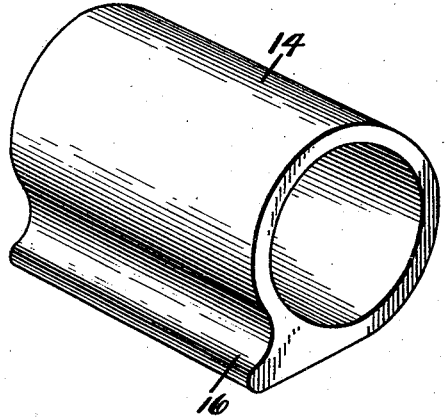
INVENTOR
William H. Foster
BY
Kiddie, Bethell and Montgomery
ATTORNEYS Patented May 12, 1942

2,282,716

UNITED STATES PATENT OFFICE 2,282,716

SPRING

William H. Foster, Mineola, N. Y., assignor to The E. R. Merrill Spring Company, New York, N. Y., a corporation of New York Application April 6, 1940, Serial No. 328,219

2 Claims. (Cl. 267—47)

This invention relates to an improvement in springs, particularly to leaf springs for heavy duty service such as in bus and truck operation.

More specifically the present invention relates to the terminal eye of the spring.

With the heavy spring loadings and better braking facilities encountered today the terminal eyes of the springs are subjected to tremendous stresses, and this invention has for one of its objects the provision of a construction which will meet these conditions satisfactorily, eliminating opening of the eye entirely, reducing likelihood of rupture at the eye to a minimum, and providing against loosening and spinning of the bushing with which the eye is lined or bushed.

In springs as made prior to my invention it is customary merely to roll the metal of the spring back upon itself to form the terminal eye. The bushing with which the eye is lined is a few thousandths larger in outside diameter than the inside diameter of the eye, and must be pressed into place. Obviously this has a tendency to open the eye, and eventually under the stresses encountered in practice the bushing works loose. This condition is somewhat accelerated too by the high pressure lubricating tools employed today which are capable of generating pressures of several thousand pounds to the square inch, so that lubricant under such high pressures is forced sometimes between the bushing and the wall of the eye.

To overcome these inherent defects, I intend to deviate very materially from present practice. According to my invention the terminals of the spring leaf will be turned back to form an eye at each end of the spring, but instead of simply turning the metal back until it meets the body of the leaf, I give it a reverse bend to produce such a shape or bend that a substantial length of the metal lies in intimate contact with the face of the leaf. The extension thus formed is welded to the leaf so as in effect to be integral therewith.

In turning the metal back upon itself to form the eye and then reversely bending to form the extension mentioned a roughly triangularly shaped space is formed in the metal which is offset with respect to the eye. I take advantage of this and employ a bushing which has an offset of the same general cross section as the space aforesaid and when the bushing is pressed into place in the eye, the offset of the bushing in the offset of the eye, the bushing is effectually held against spinning.

In the accompanying drawing I have illustrated an embodiment of my invention:

Fig. 1 is an elevational view of the terminal end of a leaf spring embodying my invention; and Fig. 2 is a view of my improved bushing.

Referring to the drawing in detail: 2 designates the body of the spring. In practicing my invention, the leaf, a material distance from its end, is rolled back upon itself to form an eye 4 offset from the leaf. As above mentioned, it has been customary heretofore to roll back only enough metal to form an eye of the desired diameter when the extreme end of the leaf meets the body of the leaf. With my invention, however, the bend in the leaf starts further away from the end of the leaf to provide a length of metal, which I have designated 6, additional to that required to form the eye. This additional length of metal is reversely bent at about the closure of the eye, as shown at 8, so that the metal 6 will lie along and contact with the face of the leaf 2 for an appreciable distance as plainly illustrated in Fig. 1.

Either before or after the metal has been formed as described, the sides of the extension 6 are undercut, and after the metal has been shaped these undercuts are filled with welded metal, as shown at 10, welding the extension 6 to the body of the spring so that the two, in effect, are integral with each other.

It will be appreciated that with this construction it is impossible for the eye 4 to open when the spring is put in service. It will be appreciated also that the spring is reinforced by the extension 6 so that it is actually stronger than those prior constructions above referred to. I might say at this point that in practice I find the bond between the extension 6 and the body of the spring leaf is complete and that there is no grain coarsening at the weld.

It will be seen from an inspection of Fig. 1 that where the metal of the leaf is given a reverse bend at 8, a roughly triangular space, designated 12, is formed, offset with respect to the eye 4. Instead of filling this space in with the welding metal to complete the eye, I take advantage of its presence in bushing the eye.

Referring now to Fig. 2 which shows the bushing designated 14, it will be seen that the same is provided with an offset 16 whose cross section is the shape of the space 12 of the eye. In assembling the eye and bushing, the flange 16 of the bushing lies in the space 12. The bushing is a press fit in the eye.

It will be evident from the foregoing that with my improved construction it is impossible for the bushing to spin in the eye. It will be apparent too that my invention provides this advance in this industry without sacrificing any good features which are inherent in existing constructions. In fact, as repeatedly pointed out above, not only is my spring superior to prior constructions so far as preventing spinning of the bushing is concerned, but it is a superior spring in that it is reinforced and the eye is unable to open no matter what conditions are met with in service.

It is to be understood that the details of construction above described may be varied within the purview of my invention.

What I claim is:

1. A leaf spring bent back upon itself adjacent the end of the leaf to form an eye offset from the leaf face, the bent back metal being given a reverse bend adjacent the closure of the eye to provide an extension of the metal of the eye overlying the face of the leaf, said extension being welded to the leaf face, and a bushing in said eye having a press fit therein and provided with an offset extending between the face of the leaf and said extension to prevent turning of the bushing in the eye.

2. A leaf spring bent back upon itself adjacent the end of the leaf to form an eye offset from the face of the leaf, the bent back metal being given a reverse bend adjacent the closure of the eye to provide an extension of the metal of the eye overlying the leaf face and to provide a space offset with respect to the eye between the face of the leaf and the reverse bend in the metal of the leaf, said extension being welded to the face of the leaf, and a bushing pressed into said eye and having an offset flange substantially conforming to the shape of the said offset space and which extends into and substantially fills the said offset space.

WILLIAM H. FOSTER.